US012732113B2

(12) United States Patent
Wang et al.

(10) Patent No.: US 12,732,113 B2
(45) Date of Patent: Sep. 8, 2026

(54) CONTROL CIRCUIT FOR A RESONANT CIRCUIT AND THE METHOD THEREOF

(71) Applicant: Chengdu Monolithic Power Systems Co., Ltd., Chengdu (CN)

(72) Inventors: Siran Wang, Hangzhou (CN); Pengfei Liu, Hangzhou (CN); Yuzhou Zhang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 456 days.

(21) Appl. No.: 18/184,202

(22) Filed: Mar. 15, 2023

(65) Prior Publication Data

US 2023/0223855 A1 Jul. 13, 2023

(30) Foreign Application Priority Data

Jul. 5, 2022 (CN) ........................ 202210790864.2

(51) Int. Cl.

*H02M 3/335* (2006.01)
*H02M 1/00* (2006.01)
*H02M 3/337* (2006.01)

(52) U.S. Cl.

CPC ..... *H02M 3/33569* (2013.01); *H02M 1/0009* (2021.05); *H02M 3/3376* (2013.01)

(58) Field of Classification Search

CPC .. H02M 1/0009; H02M 3/33571; H02M 3/01; H02M 3/3376; H02M 3/33569; H02M 1/0058; H02M 1/0003; H02M 1/0041; H02M 1/0054; H02M 1/088; H02M 3/3155; Y02B 70/10

See application file for complete search history.

(56) References Cited

U.S. PATENT DOCUMENTS

| | | | | |
|---|---|---|---|---|
| 9,525,358 | B2 * | 12/2016 | Jin | H02M 1/38 |
| 10,530,260 | B2 * | 1/2020 | Liu | H02M 3/33507 |
| 10,826,402 | B1 * | 11/2020 | Stuler | H02M 3/01 |
| 2015/0381055 | A1 * | 12/2015 | Ohtake | H02M 3/3376 363/21.02 |
| 2018/0262119 | A1 * | 9/2018 | Ouyang | H02M 3/33576 |
| 2019/0229624 | A1 | 7/2019 | Liu et al. | |

(Continued)

OTHER PUBLICATIONS

Auto-Resonant Detection Method for Optimized ZVS Operation (Year: 2021).*

*Primary Examiner* — Pinping Sun

(74) *Attorney, Agent, or Firm* — Ashurst Perkins Coie US LLP

(57) ABSTRACT

A control circuit for a resonant circuit includes a resonant current detecting circuit, a current adjustment circuit and an on-time control circuit. The resonant current detecting circuit is configured to receive a resonant current, a first reference and a second reference, and to provide a detected current signal based on the resonant current, the first reference and the second reference. The current adjustment circuit is configured to receive the detected current signal and a charging reference, and to provide an on-time control signal based on the detected current signal and the charging reference. The on-time control circuit is configured to receive the on-time control signal and an on-time initial value, and to provide an on-time signal to control a switch of the resonant circuit based on the on-time control signal and the on-time initial value.

19 Claims, 8 Drawing Sheets

(56) References Cited

U.S. PATENT DOCUMENTS

2021/0111620 A1* 4/2021 Jin .......................... H02M 3/01
2022/0166327 A1* 5/2022 Liu ..................... H02M 1/0025
2022/0247320 A1* 8/2022 Stracquadaini ... H02M 3/33569
2022/0302824 A1* 9/2022 Araumi ................. H02M 3/158

* cited by examiner

CONTROL CIRCUIT FOR A RESONANT CIRCUIT AND THE METHOD THEREOF

CROSS-REFERENCE TO RELATED APPLICATIONS

This application claims priority to and the benefit of Chinese Patent Application No. 202210790864.2, filed on Jul. 5, 2022, which is incorporated herein by reference in its entirety.

FIELD

The present invention relates generally to power supplies, and more particularly but not exclusively to switching converters.

BACKGROUND

In the conventional low-power AC/DC converters field, switching converters such as flyback converters have been widely used because of its simple structure, low cost, and it requires fewer components. However, conventional flyback converters usually operate in a hard switching mode, which means the voltage across a switch or the current flowing through the switch is not equal to zero when the switch of flyback converters is turned on/off, thereby generating switching losses. Switching losses increase as the switching frequency of the flyback converters increase. In order to minimize the scale of switching converters, switching converters often operate in higher switching frequency. To be specific, in order to reduce the size of a flyback converter while providing the same power, the switching frequency of the flyback converter need to be increased. However, for a hard-switching flyback converter, higher switching frequency means larger switching losses. This affects the performance of flyback converters in high-power application.

Soft switching technology makes the voltage across the switch to be equal to zero (i.e., zero voltage switching, ZVS) or the current flowing through the switch is equal to zero (i.e., zero current switching, ZCS) when the switch is turned on/off, thereby reducing switching losses. To make flyback converters achieve the soft switching and thus reduce switching losses, a flyback converter with a resonant circuit is presented, for example, an active clamp flyback converter and an asymmetrical half-bridge flyback converter. For instance, the asymmetrical half-bridge flyback converter combines the flyback converter with a LLC resonant circuit (i.e., a circuit including two inductors (L) and a capacitor (C)). By adopting the LLC resonant circuit on a primary side of the flyback converter, the switching frequency of the converter could be designed according to the resonant frequency of the resonant circuit, such that the switch of the primary side achieves soft switching.

SUMMARY

According to an embodiment of the present invention, a control circuit for a resonant circuit is provided. The control circuit includes a resonant current detecting circuit, a current adjustment circuit and an on-time control circuit. The resonant current detecting circuit is configured to receive a resonant current, a first reference and a second reference, and to provide a detected current signal based on the resonant current, the first reference and the second reference. The current adjustment circuit is configured to receive the detected current signal and a charging reference, and to provide an on-time control signal based on the detected current signal and the charging reference. The on-time control circuit is configured to receive the on-time control signal and an on-time initial value, and to provide an on-time signal to control a switch of the resonant circuit based on the on-time control signal and the on-time initial value.

According to another embodiment of the present invention, a resonant circuit is provided. The resonant circuit includes a first switch, a second switch and a control circuit. The first switch is coupled between an input voltage terminal and a switching terminal, and is configured to receive a first control signal. The first switch is turned on/off based on the first control signal. The second switch is coupled between the switching terminal and a primary ground terminal, and is configured to receive a second control signal. The second switch is turned on/off based on the second control signal. The control circuit includes a resonant current detecting circuit, a current adjustment circuit and an on-time control circuit. The resonant current detecting circuit is configured to receive a resonant current, a first reference and a second reference, and to provide a detected current signal based on the resonant current, the first reference and the second reference. The current adjustment circuit is configured to receive the detected current signal and a charging reference, and to provide an on-time control signal based on the detected current signal and the charging reference. The on-time control circuit is configured to receive the on-time control signal and an on-time initial value, and to provide an on-time signal to control the second switch of the resonant circuit based on the on-time control signal and the on-time initial value.

According to yet another embodiment of the present invention, a control method for a resonant circuit is provided. The resonant circuit has a transformer, a resonant capacitor coupled in series with a primary winding of the transformer, and a first switch and a second switch coupled in series between an input voltage terminal and a primary ground terminal. The control method includes three main steps. In step 1, a detected current signal is provided based on a resonant current flowing through the resonant capacitor of the resonant circuit, a first reference and a second reference. In step 2, an on-time control signal is provided based on the detected current signal and a charging reference. In step 3, an on-time signal is provided to control an on-time of the second switch of the resonant circuit based on the on-time control signal and an on-time initial value.

BRIEF DESCRIPTION OF THE DRAWINGS

The present invention can be further understood with reference to the following detailed description and the appended drawings.

DETAILED DESCRIPTION

Figure 1:
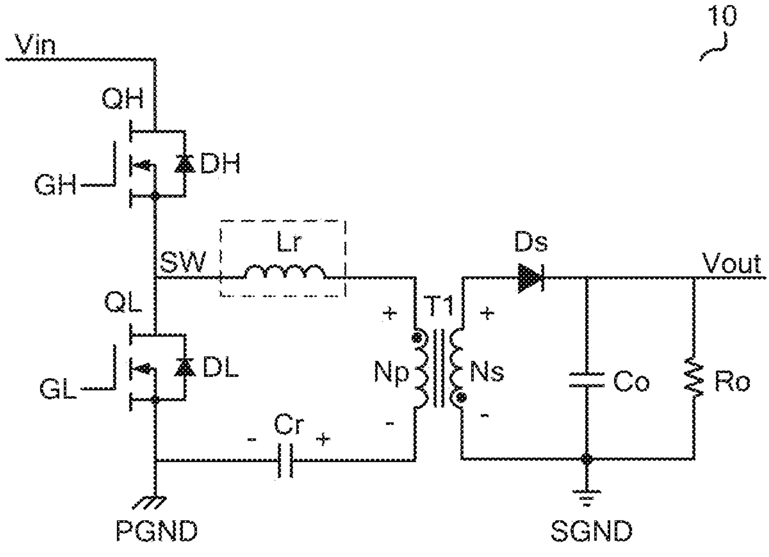
FIG. 1 schematically shows a conventional asymmetric half-bridge flyback converter.

Various embodiments of the present invention will be described in detail below, and it should be noted that the embodiments described here are only for illustration. However, the present invention is not limited thereto. In the following description, numerous specific details, such as example circuits and example values for these circuit components, and methods are illustrated in order to provide a thorough understanding of the present invention. It will be apparent for persons having ordinary skill in the art that the present invention can be practiced without one or more specific details, or with other methods, components, materials. In other instances, well-known circuits, materials or methods are not shown or described in detail in order to avoid obscuring the present invention.

Throughout this description, the phrases "in one embodiment", "in an embodiment", "in some embodiments", "in an example", "in some examples", "in one implementation", and "in some implementations" as used to include both combinations and sub-combinations of various features described herein as well as variations and modifications thereof. These phrases used herein does not necessarily refer to the same embodiment, although it may. Additionally, persons having ordinary skill in the art will understand that the drawings provided herein are for illustrative purposes and are not necessarily drawn to scale. The similar elements are provided with similar reference numerals. As used herein, the term "and/or" includes any combinations of one or more of the listed items.

FIG. 1 schematically shows a conventional asymmetric half-bridge flyback converter 10. As shown in FIG. 1, the asymmetric half-bridge flyback converter 10 includes a transformer T1, a primary side circuit and a secondary side circuit. The transformer T1 includes a primary winding Np and a secondary winding Ns. The primary side circuit includes a first switch QH and a second switch QL, coupled in series between an input voltage terminal Vin to receive the input voltage and a primary ground terminal PGND. The primary side circuit further includes a resonant capacitor Cr coupled in series with the primary winding Np between a switching terminal SW and the primary ground terminal PGND. The secondary side circuit includes a secondary switch Ds coupled in series with the secondary winding Ns and an output capacitor Co. In the embodiment as shown in FIG. 1, the resonant inductor Lr is a leakage inductance of the primary winding Np rather than an actual inductor. In some embodiments, additional resonant inductors may be applied according to practical applications. In one implementation, the secondary switch Ds is realized by a diode. In another implementation, the secondary switch Ds is realized by a controllable switch, e.g., a transistor. In one embodiment, the secondary switch Ds is coupled between the secondary winding Ns and an output voltage terminal Vout. In another embodiment, the secondary switch Ds is coupled between the secondary winding Ns and a secondary ground terminal SGND. The energy is transferred from the primary winding Np to the secondary winding Ns by alternately turning on/off the first switch QH and the second switch QL of the flyback converter 10, such that an output voltage Vout across the output capacitor Co is provided to power a load Ro.

FIGS. 2A-2F schematically show schematic diagrams illustrating the working principle of an asymmetric half-bridge flyback converter (e.g., 10 as shown in FIG. 1). FIG. 3 schematically shows waveforms of signals of an asymmetric half-bridge flyback converter in accordance with an embodiment of the present invention, where Ir is the resonant current flowing through the resonant capacitor Cr, the switching voltage Vsw is the voltage of a connection node (i.e., switching terminal SW) between the first switch QH and the second switch QL, GH is the control signal of the first switch QH, and GL is the control signal of the second switch QL.

Reference will now be made to FIGS. 2A-2F and FIG. 3 to describe the working principles of the asymmetric half-bridge flyback converter 10 as shown in FIG. 1 in accordance with an embodiment of the present invention.

Figure 2A:
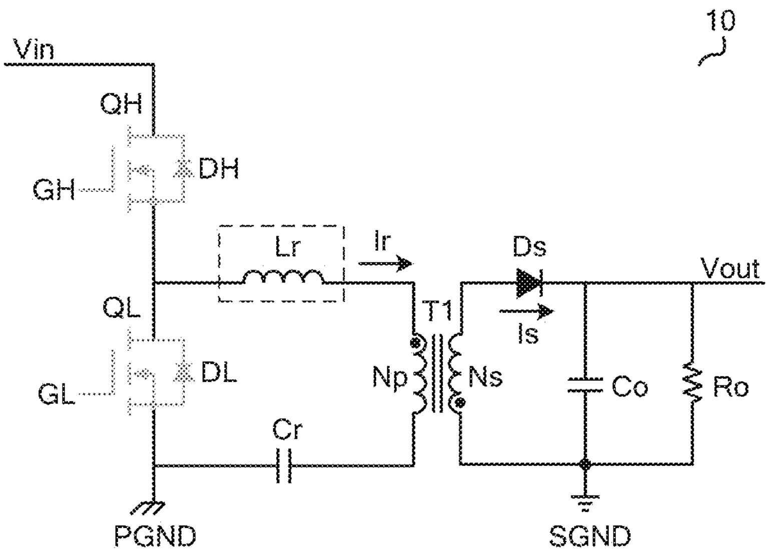
FIGS. 2A-2F schematically show schematic diagrams illustrating the working principle of an asymmetric half-bridge flyback converter.
Figure 3:
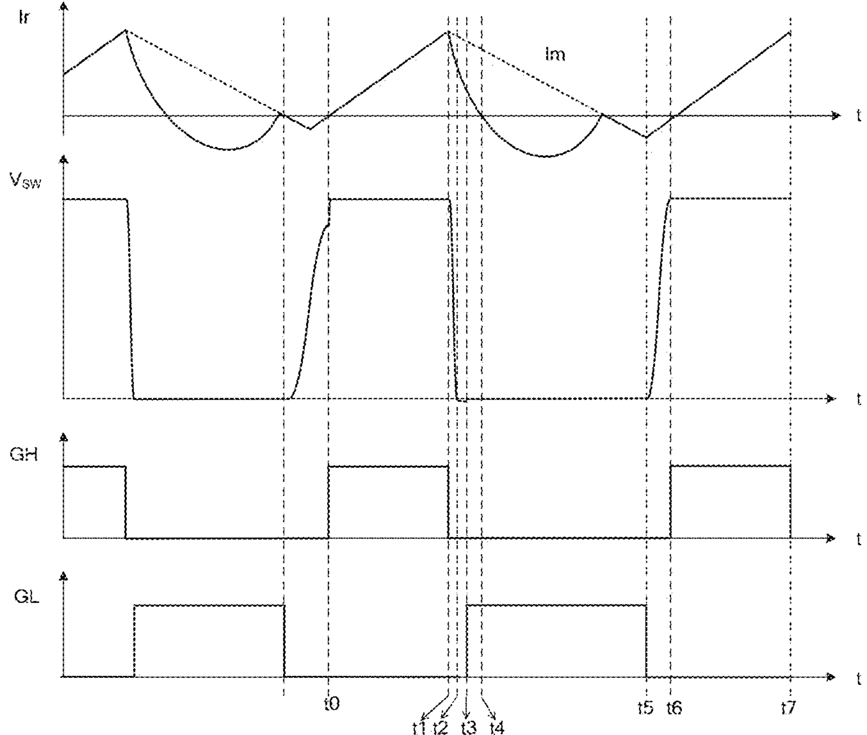
FIG. 3 schematically shows waveforms of signals of an asymmetric half-bridge flyback converter in accordance with an embodiment of the present invention.

FIG. 2A shows the equivalent circuit of the asymmetric half-bridge flyback converter 10 when the second switch QL is turned off and the first switch QH is turned off from on, which corresponding to the time period from t1 to t2 as shown in FIG. 3. As shown in FIG. 2A, when the first switch QH turns off, since the current flowing through the primary winding Np cannot change discontinuously, the resonant current Ir continues to flow through the resonant inductor Lr with the same direction but decreases gradually. At this time, the secondary switch Ds is turned on, and the secondary current $I_{Ds}$ flowing through the secondary switch Ds begins to increase. Meanwhile, the energy is transferred from the primary winding Np to the secondary winding Ns, which means the energy stored in the resonant inductor Lr is transferred to the output capacitor Co. Therefore, the resonant current Ir pulls down the switching voltage Vsw (at the time period from t1 to t2 as shown in FIG. 3) of the switching terminal SW between the first switch QH and second switch QL.

Figure 2B:
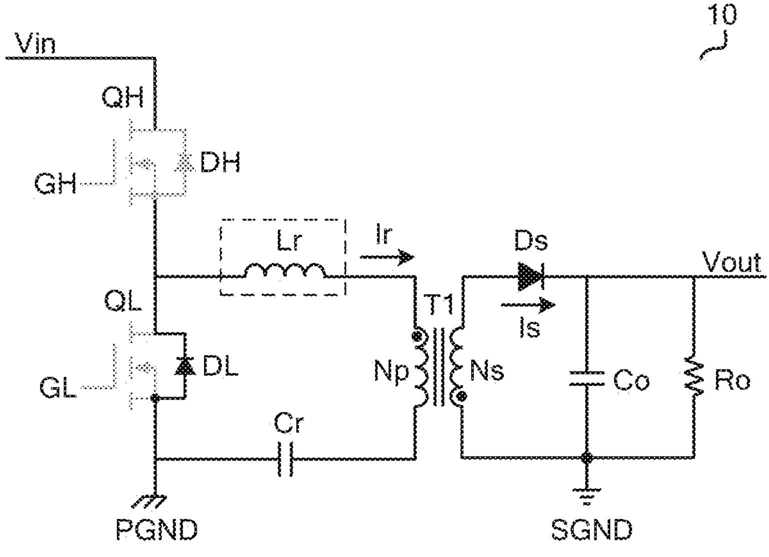

After the switching voltage Vsw is pulled down to zero by the resonant current Ir, since the second switch QL is turned off, the resonant current Ir turns on the intrinsic body diode DL of the second switch QL. FIG. 2B shows the equivalent circuit of the asymmetric half-bridge flyback converter 10 when the second switch QL is turned off while the intrinsic body diode DL of the second switch QL is turned on, which corresponding to the time period from t2 to t3 as shown in FIG. 3. At this time, the intrinsic body diode DL, the resonant inductor Lr, the primary winding Np and the resonant capacitor Cr form a circuit loop, and the resonant current Ir continues to decrease. The voltage across the primary winding is represented by: $VNp=-VCr$, where VCr is the voltage across the resonant capacitor Cr.

Figure 2C:
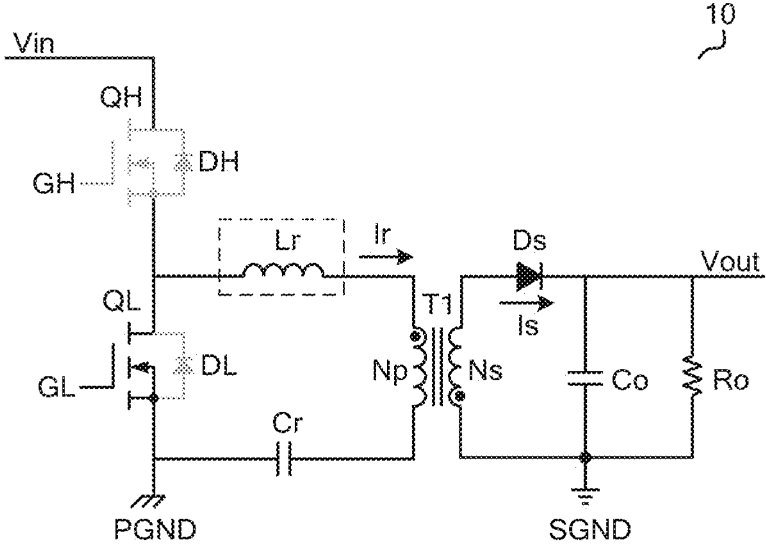

FIG. 2C shows the equivalent circuit of the asymmetric half-bridge flyback converter 10 when the first switch QH is turned off, and the second switch QL is turned on from off, which corresponding to the time period from t3 to t4 as shown in FIG. 3. At this time, the voltage across the secondary winding is represented by: $VNs \approx -(Ns/Np) \times VNp = (Ns/Np) \times VCr$.

In another implementation, when the first switch QH is turned off, the second switch QL turns on immediately after the switching voltage Vsw decreases to zero, thus achieves the ZVS turn-on, which means the operation between the time period from t2 to t3 is not necessary.

Figure 2D:
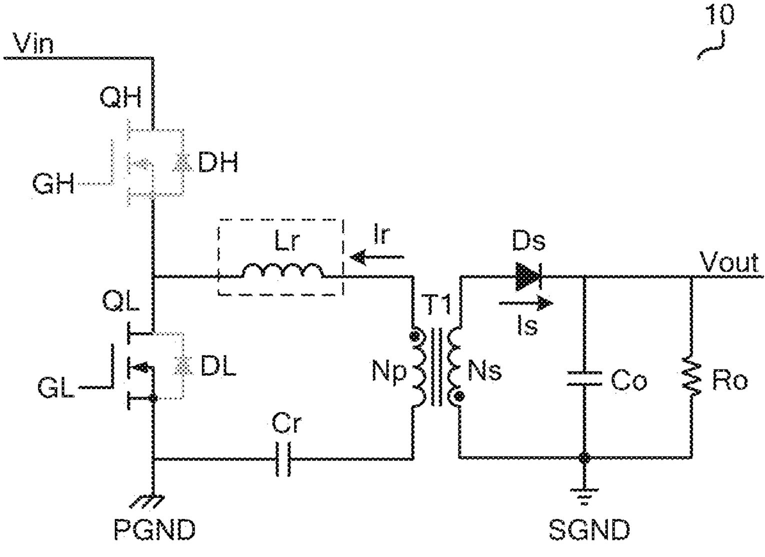

After the resonant current Ir decreases to zero at time t4, the resonant capacitor Cr starts discharging. FIG. 2D shows the equivalent circuit of the asymmetric half-bridge flyback converter 10 when the resonant capacitor Cr starts discharging, which corresponding to time period from t4 to t5 as shown in FIG. 3. As shown in FIG. 2D, the resonant current Ir changes its direction, and the secondary current $I_{Ds}$ powers the secondary winding Ns.

Figure 2E:
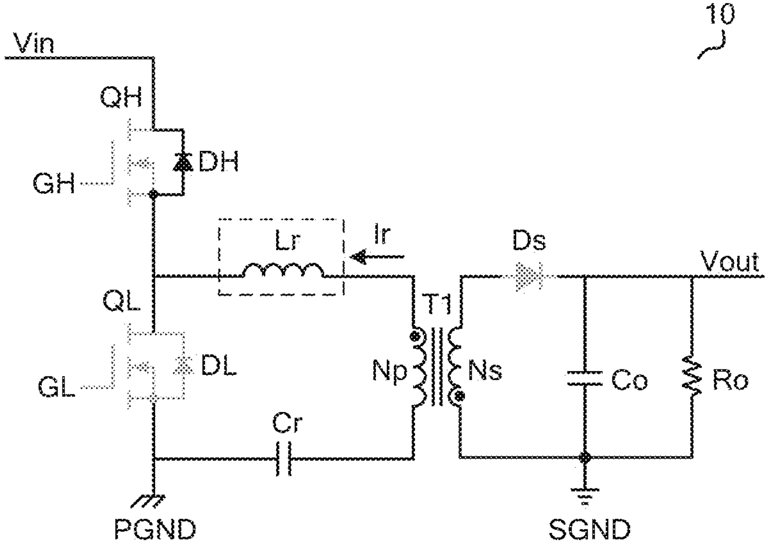

FIG. 2E shows the equivalent circuit of the asymmetric half-bridge flyback converter 10 when the first switch QH is turned off, and the second switch QL is turned off from on, which corresponding to time period from t5 to t6 as shown in FIG. 3. After the switching voltage Vsw is pulled up to the input voltage value by the negative resonant current Ir, since the first switch QH is turned off, the resonant current Ir turns on the body diode DH of the first switch QH. Meanwhile, the secondary diode Ds is reverse-biased and cut-off, and the output voltage Vout across the output capacitor Co is provided to power the load Ro.

Figure 2F:
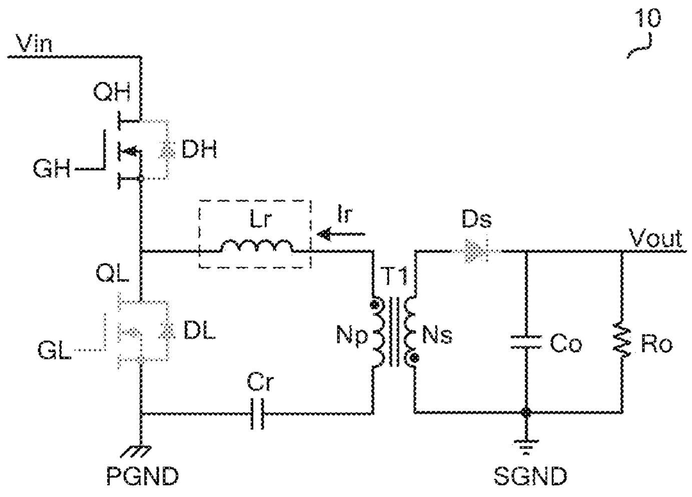

FIG. 2F shows the equivalent circuit of the asymmetric half-bridge flyback converter 10 when the first switch QH is turned on from off and the second switch QL is turned off, which corresponding to time period from t6 to t7 as shown in FIG. 3. At time t6, the resonant current Ir increases gradually from the negative value to zero and continues to increase to the positive value. Meanwhile, the input voltage charges the primary winding Np and the resonant capacitor Cr.

As shown in FIG. 3, the first switch QH turns off at time t7, and a new switching period repeats.

It should be understood that, the first switch and the second switch of the asymmetrical half-bridge flyback converter 10 is turned on/off periodically. Therefore, in one embodiment, the switching period starts from the second switch QH turns on till it turns on again. In another embodiment, the switching period starts at any state of the first switch or the second switch till this specific state appears again. For instance, as shown in FIG. 3, the switching period may be a time period from t0 to t6, or a time period from t1 to t7.

As shown in FIG. 3, at time t0, when the first switch QH turns on, the switching voltage Vsw may not reach the input voltage value. In other words, when the first switch QH is turned on, the voltage across the first switch QH is greater than zero (i.e., Vin−Vsw>0), and thus there is switching loss during turn-on. The reason why the switching voltage Vsw is no able to reach the input voltage value is due to the value of the resonant current Ir. Specifically, before tuning on the first switch QH (i.e., time t0), the resonant current Ir flows through the body diode DH of the second switch QH and also charges the intrinsic drain-source capacitor of the second switch QL. If the absolute value of the negative resonant current Ir is too small, the switching voltage Vsw may not be pulled up to the input voltage value. As a result, when the first switch QH turns on, the voltage across the first switch QH is not equal to zero (i.e., Vin−Vsw>0).

Figure 4:
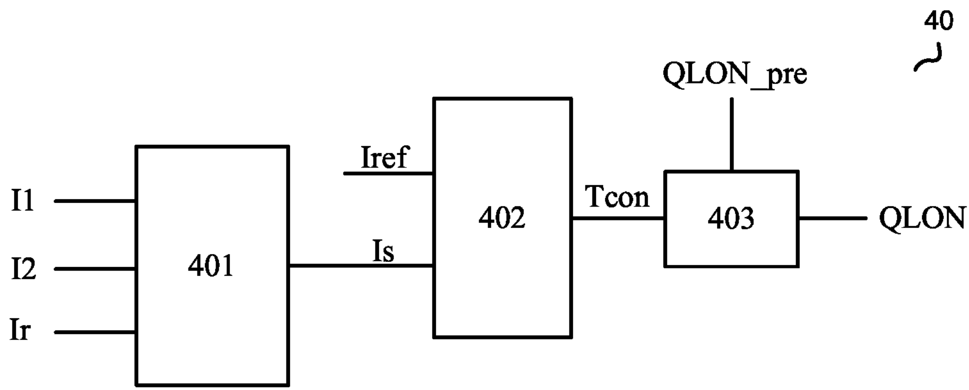
FIG. 4 schematically shows a control circuit 40 of an asymmetric half-bridge flyback converter in accordance with an embodiment of the present invention.

FIG. 4 schematically shows a control circuit 40 for an asymmetric half-bridge flyback converter in accordance with an embodiment of the present invention. As shown in FIG. 4, the control circuit 40 includes a resonant current detecting circuit 401, a current adjustment circuit 402, and an on-time control circuit 403. The resonant current detecting circuit 401 is configured to receive the resonant current Ir, a first reference I1 and a second reference I2, and to provide a detected current signal Is. The current adjustment circuit 402 is configured to receive the detected current signal Is and an charging reference Iref, and to provide an on-time control signal Tcon based the detected current signal Is and the charging reference Iref. The on-time control circuit 403 is configured to receive the on-time control signal Ton and an on-time initial value QLON_pre, and to provide an on-time signal QLON to control the on-time of the second switch QL. For instance, the control circuit 40 records the on-time of the second switch QL in the previous switching period, and generates the on-time signal QLON according to the on-time control signal Tcon, to control the on-time of the second switch QL in the next switching period. Therefore, by controlling the on-time of the second switch QL, the absolute value of the resonant current Ir is large enough to make the switching voltage Vsw of the switching terminal SW increase to the input voltage before turning on the first switch QH. In other words, the voltage difference between the two terminals of the first switch QH is zero when the first switch QH is turned on, thereby achieving the zero voltage switching.

Specifically, the detected current signal Is is the resonant current Ir at the start time. In one embodiment, the start time is the time t6 as shown in FIG. 3. In other embodiments, the start time may be before, during, or after turning on the first switch QH (e.g., t5-t7). The charging reference Iref may be the target current value of the resonant current Ir at the start time. In the embodiment as shown in FIG. 4, when the detected current signal Is is smaller than the charging reference Iref, the current adjustment circuit 402 provides the on-time control signal Tcon to adjust the on-time of the second switch QL. In one embodiment, the on-time initial value QLON_pre is provided by a register of the control circuit 40. The register is configured to store a signal indicating the on-time of the second switch QL in the current switching period. The on-time of the second switch QL in the next switching period is calculated based the on-time of the second switch QL of the current switching period. In one embodiment, the value of the on-time signal QLON is calculated based on the on-time initial value QLON_pre and the value of the on-time control signal Tcon.

In one embodiment, when the resonant current Ir reaches the peak value, the first switch QH turns off, and then the second switch QL turns on, and the on-time of the second switch QL is decided by the value of the on-time signal QLON. In one embodiment, the on-time initial value QLON_pre is calculated based on the peak value of the resonant current Ir and the slope of the excitation current Im of the primary side of the transformer T1 (as shown in FIG. 3). The excitation current Im is calculated based on the peak value of the resonant current Ir, the turns ratio of the primary winding Np to the secondary winding Ns, and the voltage across the secondary winding Ns, which is well known by the persons having ordinary skill in the art and descriptions thereof are omitted here. The on-time control circuit 403 updates the on-time signal according to the on-time control signal Tcon to provide the updated on-time signal to adjust the on-time of the second switch QL in the next switching period.

Figure 5:
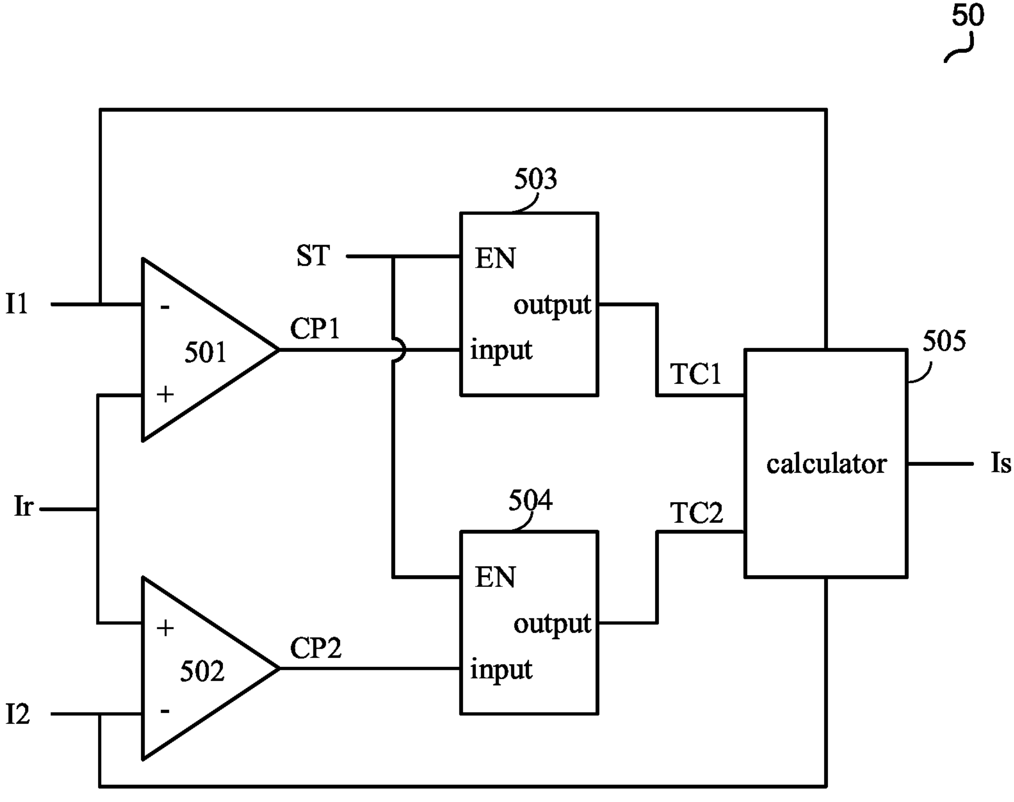
FIG. 5 schematically shows a resonant current detecting circuit 50 in accordance with an embodiment of the present invention.

FIG. 5 schematically shows a resonant current detecting circuit 50 in accordance with an embodiment of the present invention. The resonant current detecting circuit 50 could be applied to the control circuit 40 in FIG. 4. As shown in FIG. 5, the resonant current detecting circuit 50 includes a first comparison circuit 501, a second comparison circuit 502, a first timing circuit 503, a second timing circuit 504 and a calculating circuit 505. The first comparison circuit 501 is configured to receive the resonant current Ir and the first reference I1, and to provide a first comparison signal CP1 based on the resonant current Ir and the first reference I1. The second comparison circuit 502 is configured to receive the resonant current Ir and the second reference I2, and to provide a second comparison signal CP2 based on the resonant current Ir and the second reference I2. The first timing circuit 503 is configured to receive a timing start signal ST and the first comparison signal CP1, and to provide a first timing signal TC1. The second timing circuit 504 is configured to receive the timing start signal ST and the second comparison signal CP2, and to provide a second timing signal TC2. The calculating circuit 505 is configured to receive the first reference I1, the second reference I2, the first timing signal TC1 and the second timing signal TC2, and to provide the detected current signal Is.

In one embodiment, the first reference I1 and the second reference I2 are two independent reference current signals. In another embodiment, the second reference I2 is generated based on the first reference I1. In some embodiments, the value of the second reference I2 is proportional to the value of the first reference I1. For example, the value of the second reference I2 is twice the value of the first reference I1.

Figure 6:
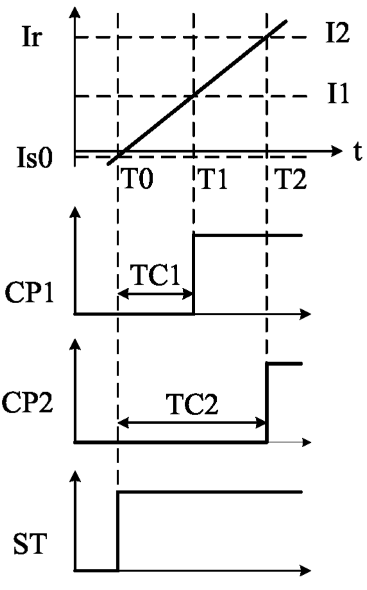
FIG. 6 schematically shows waveforms of signals of the resonant current detecting circuit 50 in accordance with an embodiment of the present invention.

FIG. 6 schematically shows waveforms of signals of the resonant current detecting circuit 50 in accordance with an embodiment of the present invention. As shown in FIG. 6, when the first switching QH is turned on, the resonant current Ir starts increasing, and when the resonant current Ir increases to the first reference I1, the first comparison signal CP1 is changed from a first voltage level (e.g., low) to a second voltage level (e.g., high). When the resonant current Ir increases to the second reference I2, the second comparison signal CP2 is changed from the first voltage level (e.g., low) to the second voltage level (e.g., high). The first timing circuit 503 is configured to receive the timing start signal ST and the first comparison signal CP1. For instance, the first timing circuit 503 starts timing at a start time T0 represented by the timing start signal ST (e.g., at the turn-on time of the first switch QH), and stops timing when the first comparison signal CP1 changes from the first voltage level (e.g., low) to the second voltage level (e.g., high), and then provides the first timing signal TC1. In other words, the first timing signal TC1 indicates the time duration starting from the start time T0 represented by the timing start signal ST to the time T1 when the resonant current Ir reaches the first reference I1. Similarly, the second timing signal TC2 starts timing at the start time T0, and stops timing when the second comparison signal CP2 changes from the first voltage level (e.g., low) to the second voltage level (e.g., high), and then provides the second timing signal TC2. In other words, the second timing signal TC2 indicates the time duration starting from the start time T0 to the time T2 when the resonant current Ir reaches the second reference I2. As shown in FIG. 6, the resonant current at the start time Is0 could be expressed as:

$$Is0 = I1 - \frac{TC1}{TC2 - TC1} \times (I2 - I1). \tag{1}$$

In one implementation, when the value of the second reference I2 is twice the value of the first reference I1, the equation (1) could be expressed as:

$$Is0 = I1 \times \frac{TC2 - 2TC1}{TC2 - TC1}. \tag{2}$$

The calculation of the equations (1) and (2) could be performed by the calculating circuit 505. In one embodiment, the resonant current at the start time Is0 indicates the value of the detected current signal Is. The calculating circuit 505 may be realized by a digital circuit generated by hardware description language (e.g., Verilog, VHDL). In other embodiments, the calculation is realized by charging/discharging a capacitor circuit to obtain the detected current signal Is.

In one embodiment, the timing start signal ST is a signal indicating the first switch is turned on, e.g., the control signal GH of the first switch QH. In other embodiments, the timing start signal ST is generated by applying a delay to the control signal GH. In some embodiments, the timing start signal ST is a signal indicating a start time that is before the first switch is turned on. For example, the start time represented by the timing start signal ST is after the second switch QL turns off and before the first QH turns on (e.g., t5-t6 in FIG. 3). In some embodiments, the timing start signal ST may be other signals indicating the start time that is before, during, or after turning on the first switch QH (e.g., within t5-t7 in FIG. 3). It should be understood that, the equation (1) is based on the assumption that, when the first switch QH turns on, the resonant current Ir increases linearly as the first switch QH turns on. Specifically, the waveform of the resonant current Ir is approximately a sinusoidal curve from the turn-on time of the first switch to the turn-off time of the first switch QH. Since part of the waveform from the valley value to the peak value of the sin curve is approximately a straight line, the resonant current could be estimated according to the above linear equation. Persons having ordinary skill in the art may determine the value of the first reference I1 and the second reference I2 based on the linear part of the curve, practical applications and system parameters. In some embodiments, the value of the first reference I1 is 300 mA, and the second reference I2 is 600 mA.

It should be understood that, the voltage level or logic state of the signals in FIG. 6 is only for illustrating the principles of the invention. In practical applications, the value of the signals could be adjusted based on the requirements of applications. As long as the two current reference is within a time period when the resonant current Ir increases linearly, the detected current signal Is could be calculated based on the equations (1) and/or (2). Therefore, besides the first control signal GH, other signals indicating the turn-on time of the first switch QH may also be applied in the present invention. Furthermore, the two time durations could start within the time period when the resonant current Ir increases linearly, and the value of the detected current signal Is is calculated accordingly. The timing start signal ST may be used to control the first timing circuit 503 and the second timing circuit 504 to start timing at the start time.

Figure 7:
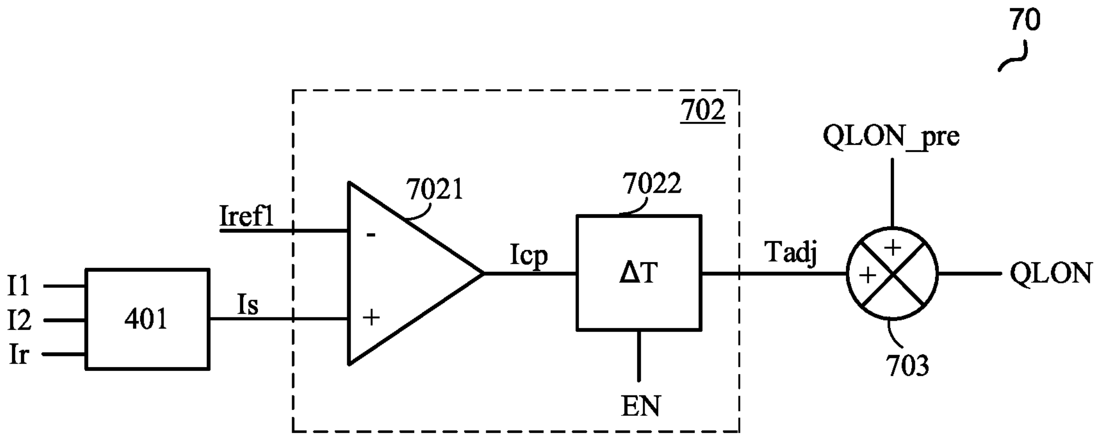
FIG. 7 schematically shows a control circuit 70 of an asymmetric half-bridge flyback converter in accordance with an embodiment of the present invention.

FIG. 7 schematically shows a control circuit 70 of an asymmetric half-bridge flyback converter in accordance with an embodiment of the present invention. As shown in FIG. 7, the control circuit 70 includes the resonant current detecting circuit 401, a current adjustment circuit 702 and an on-time control circuit 703. The resonant current detecting circuit 401 is configured to receive the resonant current Ir, the first reference I1 and the second reference I2, and to provide the detected current signal Is based the first reference I1, the second reference I2 and the resonant current Ir.

The current adjustment circuit 702 is configured to receive the detected current signal Is and a first charging reference Iref1, and to provide the time adjustment signal Tadj based the detected current signal Is and the first charging reference Iref1. The on-time control circuit 703 is configured to receive the time adjustment signal Tadj and the on-time initial value QLON_pre, and to provide the on-time signal QLON based on the time adjustment signal Tadj and the on-time initial value QLON_pre to control the on-time of the second switch QL.

In one embodiment, the current adjustment circuit 702 includes a current comparison circuit 7021 and a time adjustment circuit 7022. The current comparison circuit 7021 is configured to receive the detected current signal Is and the first charging reference Iref1, and to provide a current comparison signal Icp based on the detected current signal Is and the first charging reference Iref1.

The time adjustment circuit 7022 is configured to receive the current comparison signal Icp and an enable signal EN, and to provide the time adjustment signal Tadj based on the current comparison signal Icp and the enable signal EN. In one embodiment, the time adjustment signal Tadj indicates the adjusted time value. In some embodiments, the time adjustment signal Tadj may include current/voltage signal having a rising edge and falling edge. In some other embodiments, the time adjustment signal Tadj includes a time duration value. For instance, when the detected current signal Is is larger than the first charging reference Iref1, the current comparison signal Icp provided by the current comparison circuit 7021 changes from a first voltage level (e.g., low) to a second voltage level (e.g., high). When the current comparison signal Icp changes from the first voltage level (e.g., low) to the second voltage level (e.g., high), the time adjustment signal Tadj is set to a preset value. The time adjustment signal Tadj is added to the on-time initial value QLON_pre to provide the adjusted on-time signal QLON to increase the on-time of the second switch QL. In other words, the updated on-time of the second switch QL is longer than the previous on-time. In one embodiment, the preset value of the time adjustment signal Tadj is set by the register. In some embodiments, the preset value of the time adjustment Tadj is adjusted by other components. In other embodiments, the preset value of the time adjustment signal Tadj is configured through a communication interface. The enable signal EN resets or enables the time adjustment circuit 7022 every switching period. The determination of the value of the on-time of the second switch QL is not affected by the enable signal EN. In some implementations, the second control signal GL, the first control signal GH or other clock signals that triggered every switching period may be used as the enable signal EN to reset or enable the time adjustment circuit 7022. In one embodiment, after the time adjustment circuit 7022 is reset by the enable signal EN, the value of the time adjustment signal Tadj is set to zero. In other embodiments, after the time adjustment circuit 7022 is reset, the value of the time adjustment signal Tadj is set to an initial value that is not zero.

In one embodiment of FIG. 7, the on-time control circuit 703 is an adding circuit configured to perform addition on the on-time initial value QLON_pre of the second switch QL and the time adjustment signal Tadj to generate the on-time signal QLON for controlling the on-time of the second switch QL.

Figure 8:
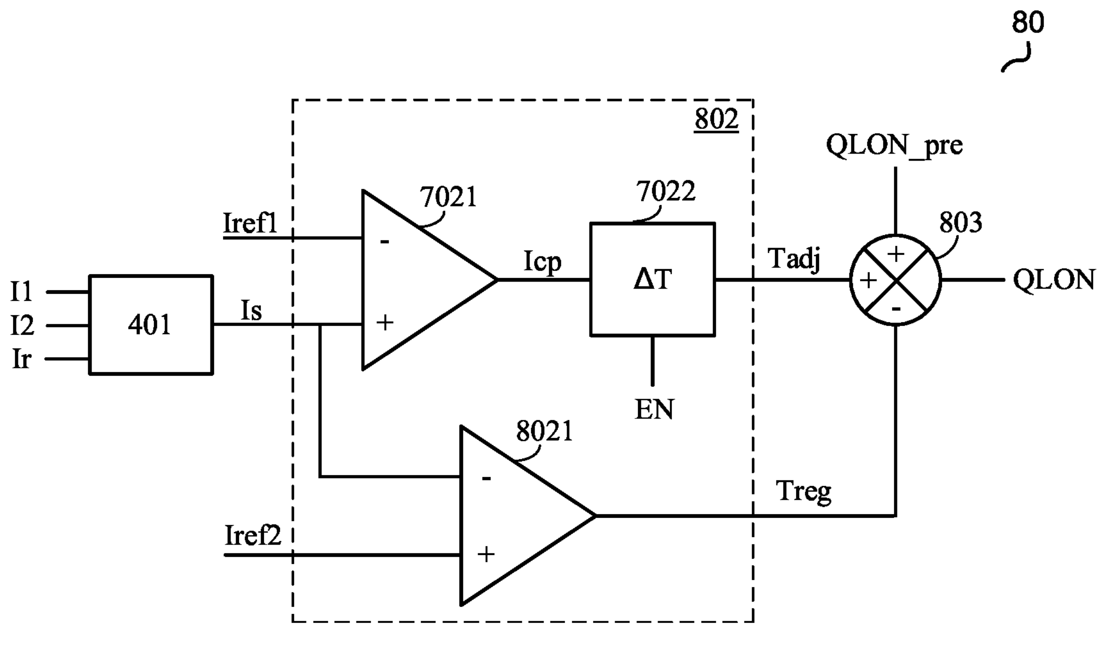
FIG. 8 schematically shows a control circuit 80 of an asymmetric half-bridge flyback converter in accordance with an embodiment of the present invention.

FIG. 8 schematically shows a control circuit 80 of an asymmetric half-bridge flyback converter 80 in accordance with an embodiment of the present invention. As shown in FIG. 8, the control circuit 80 includes the resonant current detecting circuit 401, a current adjustment circuit 802 and an on-time control circuit 803. The resonant current detecting circuit 401 is configured to receive the resonant current Ir, the first reference I1 and the second reference I2, and to provide the detected current signal Is based on the resonant current Ir, the first reference I1 and the second reference I2. The current adjustment circuit 802 is configured to receive the detected current signal Is, the first charging reference Iref1 and a second charging reference Iref2, and to provide the time adjustment signal Tadj and a time regulation signal Treg based on the detected current signal Is, the first charging reference Iref1 and the second charging reference Iref2. The on-time control circuit 803 is configured to receive the time adjustment signal Tadj, the time regulation signal Treg and the on-time initial value QLON_pre, and to provide the on-time signal QLON based on the time adjustment signal Tadj, the time regulation signal Treg and the on-time initial value QLON_pre to control the on-time of the second switch QL.

In one embodiment, the current adjustment circuit 802 includes the current comparison circuit 7021, the time adjustment circuit 7022 and an error amplifier circuit 8021. The current comparison circuit 7021 is configured to receive the detected current signal Is and the first charging reference Iref1, and to provide the current comparison signal Icp based on the detected current signal Is and the first charging reference Iref1. The time adjustment circuit 7022 is configured to receive the current comparison signal Icp and the enable signal EN, and to provide the time adjustment signal Tadj based the current comparison signal Icp and the enable signal EN. The error amplifier circuit 8021 is configured to receive the detected current signal Is and the second charging reference Iref2, and to provide the time regulation signal Treg based on the detected current signal Is and the second charging reference Iref2. For instance, when the detected current signal Is is larger than the first charging reference Iref1, the current comparison signal Icp provided by the current comparison circuit 7021 changes from the first voltage level (e.g., low) to the second voltage level (e.g., high). When the current comparison signal Icp changes from the first voltage level (e.g., low) to the second voltage level (e.g., high), the time adjustment circuit 7022 provides the time adjustment signal Tadj. The time adjustment signal Tadj is added to the on-time initial value QLON_pre to provide the adjusted on-time signal QLON to increase the on-time of the second switch QL, i.e., the on-time of the second switch QL increases. The enable signal EN resets or enables the time adjustment circuit 7022 every switching period. The error amplifier circuit 8021 provides the time regulation signal Treg based on the detected current signal Is and the second charging reference Iref2. The time regulation signal Treg provided by the error amplifier circuit 8021 increases as the detected current signal Is decreases. In one embodiment, the time regulation signal Treg indicates the adjusted time value. In some embodiments, the time regulation signal Treg may include current/voltage signal having a rising edge and falling edge. In some other embodiments, the time regulation signal Treg includes a time duration value. The on-time signal QLON is provided by performing calculation based on the on-time initial value QLON_pre, the time adjustment signal Tadj, and the time regulation signal Treg to control the on-time of the second switch QL. In one embodiment, the on-time of the second switch could be expressed as: QLON=QLON_pre+Tadj−Treg. If the detected current signal Is decreases, since the time regulation signal Treg increases accordingly, the on-time signal QLON is adjusted to have a shorter on-time of the second switch QL. This reduces the switching loss of the first switch QH, and thus improves the circuit efficiency.

In one embodiment of FIG. 8, the on-time control circuit 803 is a calculating circuit configured to perform calculation based on the on-time initial value QLON_pre, the time adjustment signal Tadj, and the time regulation signal Treg to provide the on-time signal QLON for controlling the on-time of the second switch QL.

In one embodiment, the second charging reference Iref2 is smaller than the first charging reference Iref1. Persons having ordinary skill in the art may set the first charging reference Iref1 and the second charging reference Iref2 according to practical applications.

Figure 9:
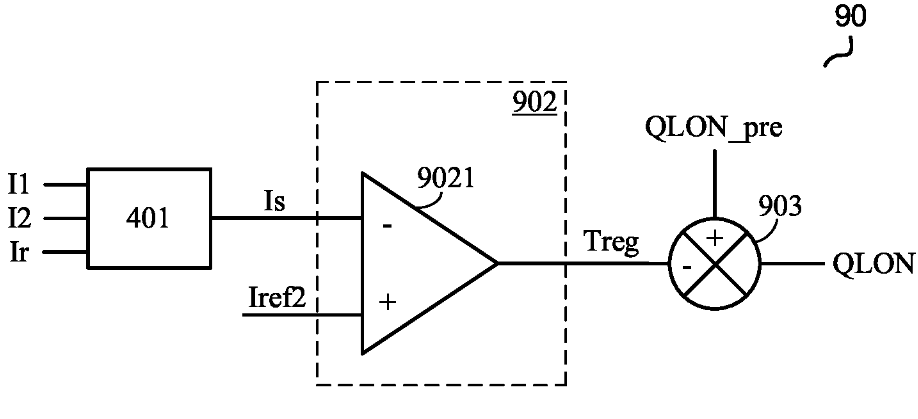
FIG. 9 schematically shows a control circuit 90 of an asymmetric half-bridge flyback converter in accordance with an embodiment of the present invention.

FIG. 9 schematically shows a control circuit 90 of an asymmetric half-bridge flyback converter in accordance with an embodiment of the present invention. As shown in FIG. 9, a control circuit 90 includes the resonant current detecting circuit 401, a current adjustment circuit 902 and an on-time control circuit 903. The resonant current detecting circuit 401 is configured to receive the resonant current Ir, the first reference I1 and the second reference I2, and to provide the detected current signal Is based on the resonant current Ir, the first reference I1 and the second reference I2. The current adjustment 902 is configured to receive the detected current signal Is and the second charging reference Iref2, and to provide the time regulation signal Treg based on the detected current signal Is and the second charging reference Iref2. The on-time control circuit 903 is configured to receive the time regulation signal Treg and the on-time initial value QLON_pre, and to provide the on-time signal QLON based on the regulating signal Treg and the on-time initial value QLON_pre to control the on-time of the second switch QL.

In one embodiment, the current adjustment circuit 902 includes an error amplifier circuit 9021. The error amplifier circuit 9021 is configured to receive the detected current signal Is and the second charging reference Iref2, and to provide the time regulation signal Treg based on the detected current signal Is and the second charging reference Iref2. The time regulation signal Treg provided by the error amplifier circuit 9021 increases as the detected current signal Is decreases. The time regulation signal Treg is subtracted from the on-time initial value QLON_pre to provide the adjusted on-time signal QLON to decrease the on-time of the second switch QL, which could be expressed as: QLON=QLON_pre-Treg. If the detected current signal Is decreases, since the time regulation signal Treg increases accordingly, the on-time signal QLON is adjusted to have a shorter on-time of the second switch QL to reduce switching loss of the first switch QH, and thus improves the circuit efficiency.

In the embodiment of FIG. 9, the on-time control circuit 903 is a subtracting circuit configured to perform subtraction on the time regulation signal Treg and the on-time initial value QLON_pre to provide the on-time signal for controlling the on-time of the second switch QL.

Figure 10:
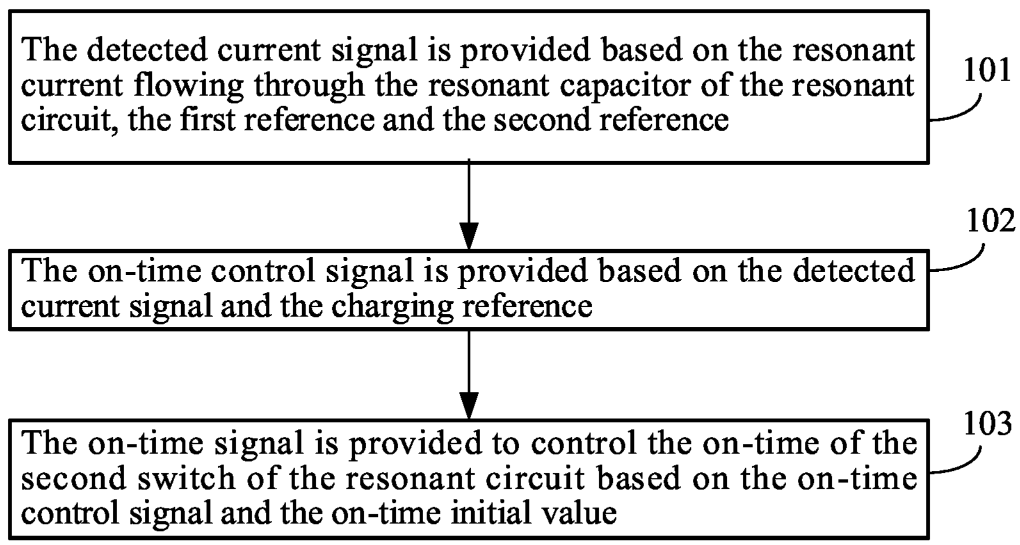
FIG. 10 schematically shows a flowchart of a control method 100 used in a resonant circuit in accordance with an embodiment of the present invention.

FIG. 10 schematically shows a flowchart of a control method 100 used in resonant circuits in accordance with an embodiment of the present invention. The resonant circuit includes the asymmetric half-bridge flyback converter 10 in FIG. 1. As shown in FIG. 10, the control method 100 includes the following steps. In step 101, the detected current signal is provided based on the resonant current flowing through the resonant capacitor of the resonant circuit, the first reference and the second reference. In step 102, the on-time control signal is provided based on the detected current signal and the charging reference. In step 103, the on-time signal is provided to control the on-time of the second switch of the resonant circuit based on the on-time control signal and the on-time initial value.

In one embodiment, the on-time initial value is the on-time signal of the second switch in the previous switching period. In other embodiments, the on-time initial value may be a fixed on-time signal set by circuit. The on-time signal is obtained by performing calculation on the on-time control signal and the on-time initial value so as to generate the second control signal of the second switch, thereby controlling the on-time of the second switch.

In one embodiment, the step 101 further includes steps 1010-1014. In step 1010, the first comparison signal is provided based on the first reference and the detected current signal. In step 1011, the second comparison signal is provided based on the second reference and the detected current signal. In step 1012, the first timing signal is provided based on the first comparison signal and timing start signal. In step 1013, the second timing signal is provided based on the second comparison signal and timing start signal. In step 1014, the detected current signal is provided based on the first reference, the second reference, the first timing signal and the second timing signal. The timing start signal is a signal indicating the first switch of the resonant circuit is turned on.

In one embodiment, the step 102 further includes multiple steps. For instance, the current comparison signal is provided based on the comparison result of the detected current signal and the first charging reference. The time adjustment signal is provided based on the current comparison signal and the enable signal. When the detected current signal is larger than the first charging reference, the time adjustment signal is set to the preset value. The enable signal resets the time adjustment signal every switching period The charging reference includes the first charging reference.

Accordingly, the step 103 further includes a step. For instance, the on-time signal is provided to control the on-time of the second switch of the resonant circuit based on performing addition on the on-time initial value and the time adjustment signal.

In one embodiment, the step 102 further includes multiple steps. For instance, the current comparison signal is provided based on the detected current signal and the first charging reference. The time adjusting signal is provided based on the current comparison signal and the enable signal. The time regulation signal is provided based on the detected current signal and the second charging reference. When the detected current signal is larger than the first charging reference, the time adjustment is set to the preset value. The enable signal resets the time adjustment signal every switching period. The charging reference includes the first charging reference and the second charging reference, and the on-time control signal includes the time adjustment signal and the time regulation signal.

In one embodiment, the second charging reference is smaller than the first charging reference.

Accordingly, the step 103 further includes a step. For instance, the on-time signal is provided to control the on-time of the second switch of the resonant circuit based on performing calculation on the on-time initial value, the time adjustment signal, and the time regulation signal.

In one embodiment, the step 102 further includes a step. For instance, the time regulation signal is provided based on the detected current signal and the second charging reference. The enable signal resets the time adjustment signal every switching period. The charging reference includes the second charging reference.

Accordingly, the step 103 includes a step. For instance, the on-time signal is provided to control the on-time of the second switch of the resonant circuit based on performing subtraction on the time regulation signal and the on-time initial value.

In one embodiment, the value of the time regulation signal increases as the detected current signal decreases.

It should be understood, the circuit and the method described or shown in the present invention are only for illustration purpose. However, the present invention is not limited thereto. It is well understood that each element of the circuit/method may be realized by other circuits performing the same function and/or operation.

The above embodiments is described with reference to an asymmetrical half-bridge flyback converter to illustrate the control circuits and control methods to control a resonant current to achieve the zero voltage switching of the resonant switch. It should be understood that, the control circuits and the control methods proposed in present invention may be applied in other resonant circuits, such as LLC resonant circuits, LCC resonant circuits (i.e., a circuit including an inductor (L) and two capacitors (C)). As stated above, the control circuit and control method proposed in the present invention estimate the current flowing through the resonant circuit when the first switch turns on, so as to adjust the on-time of the second switch to make the first switch achieve zero voltage switching.

Although the invention has been described with reference to several exemplary embodiments, it should be understood that by persons skilled in the art that the present disclosure is not limited to what has been particularly shown and described herein above. Rather the scope of the present disclosure is defined by the claims and includes both combinations and sub-combinations of the various features described hereinabove as well as variations and modifications thereof which would occur to persons skilled in the art upon reading the foregoing description and which are not in the prior art.

What is claimed is:

1. A control circuit for a resonant circuit, the control circuit comprising:

a resonant current detecting circuit configured to receive a resonant current, a first reference and a second reference, and to provide a detected current signal based on the resonant current, the first reference and the second reference;

a current adjustment circuit configured to receive the detected current signal and a charging reference, and to provide an on-time control signal based on the detected current signal and the charging reference; and an on-time control circuit configured to receive the on-time control signal and an on-time initial value, and to provide an on-time signal to control a switch of the resonant circuit based on the on-time control signal and the on-time initial value;

and wherein the resonant current detecting circuit comprises:

a first comparison circuit configured to receive the resonant current and the first reference, and to provide a first comparison signal based on the resonant current and the first reference;

a second comparison circuit configured to receive the resonant current and the second reference, and to provide a second comparison signal based on the resonant current and the second reference;

a first timing circuit configured to receive a timing start signal and the first comparison signal, and to provide a first timing signal;

a second timing circuit configured to receive the timing start signal and the second comparison signal, and to provide a second timing signal; and a calculating circuit configured to receive the first reference, the second reference, the first timing signal and the second timing signal, and to provide the detected current signal based on the first reference, the second reference, the first timing signal and the second timing signal.

2. The control circuit of claim 1, wherein the charging reference comprises a first charging reference, and the current adjustment circuit comprises:

a current comparison circuit configured to receive the detected current signal and the first charging reference, and to provide a current comparison signal based on the detected current signal and the first charging reference; and a time adjustment circuit configured to receive the current comparison signal and an enable signal, and to provide a time adjustment signal based on the current comparison signal and the enable signal;

wherein the time adjustment circuit is further configured to be reset every switching period in response to the enable signal.

3. The control circuit of claim 2, wherein the on-time control circuit comprises:

an adding circuit configured to perform addition on the time adjustment signal and the on-time initial value to provide the on-time signal for controlling the on-time of the switch.

4. The control circuit of claim 2, wherein the charging reference further comprises a second charging reference, and wherein the current adjustment circuit further comprises:

an error amplifier circuit configured to receive the detected current signal and the second charging reference, and to provide a time regulation signal based on the detected current signal and the second charging reference;

wherein the first charging reference is larger than the second charging reference.

5. The control circuit of claim 4, wherein the on-time control circuit comprises:

a calculating circuit configured to perform calculation based on the time adjustment signal, the on-time initial value, and the time regulation signal to provide the on-time signal for controlling the on-time of the switch.

6. The control circuit of claim 1, wherein the current adjustment circuit comprises:

an error amplifier circuit configured to receive the detected current signal and the charging reference, and to provide a time regulation signal based on the detected current signal and the charging reference.

7. The control circuit of claim 6, wherein the on-time control circuit comprises:

a subtracting circuit configured to perform subtraction on the time regulation signal and the on-time initial value to provide the on-time signal for controlling the on-time of the switch.

8. A resonant circuit, comprising:

a first switch, coupled between an input voltage terminal and a switching terminal, configured to receive a first control signal, wherein the first switch is turned on/off based on the first control signal;

a second switch, coupled between the switching terminal and a primary ground terminal, configured to receive a second control signal, wherein the second switch is turned on/off based on the second control signal; and a control circuit, comprising:

a resonant current detecting circuit configured to receive a resonant current, a first reference and a second reference, and to provide a detected current signal based on the resonant current, the first reference and the second reference;

a current adjustment circuit configured to receive the detected current signal and a charging reference, and to provide an on-time control signal based on the detected current signal and the charging reference; and an on-time control circuit configured to receive the on-time control signal and an on-time initial value, and to provide an on-time signal to control the second switch of the resonant circuit based on the on-time control signal and the on-time initial value;

and wherein the resonant current detecting circuit comprises:

a first comparison circuit configured to receive the resonant current and the first reference, and to provide a first comparison signal based on the resonant current and the first reference;

a second comparison circuit configured to receive the resonant current and the second reference, and to provide a second comparison signal based on the resonant current and the second reference;

a first timing circuit configured to receive a timing start signal and the first comparison signal, and to provide a first timing signal;

a second timing circuit configured to receive the timing start signal and the second comparison signal, and to provide a second timing signal; and a calculating circuit configured to receive the first reference, the second reference, the first timing signal and the second timing signal, and to provide the detected current signal based on the first reference, the second reference, the first timing signal and the second timing signal.

9. The resonant circuit of claim 8, further comprising:

a transformer comprising a primary winding and a secondary winding;

a resonant capacitor coupled in series between the switching terminal and the primary ground terminal; and a secondary switch coupled to the secondary winding.

10. The resonant circuit of claim 8, wherein the current adjustment circuit comprises:

a current comparison circuit configured to receive the detected current signal and a first charging reference, and to provide a current comparison signal based on the detected current signal and the first charging reference; and a time adjustment circuit configured to receive the current comparison signal and an enable signal, and to provide a time adjustment signal based on the current comparison signal and the enable signal;

wherein the time adjustment signal is reset every switching period in response to the enable signal.

11. A control method for a resonant circuit having a transformer, a resonant capacitor coupled in series with a primary winding of the transformer, and a first switch and a second switch coupled in series between an input voltage terminal and a primary ground terminal, wherein the control method comprises:

providing a first comparison signal based on a first reference and a resonant current;

providing a second comparison signal based on a second reference and the resonant current;

providing a first timing signal based on the first comparison signal and a timing start signal;

providing a second timing signal based on the second comparison signal and the timing start signal; and providing a detected current signal based on the first reference and the second reference, the first timing signal and the second timing signal, wherein the detected current signal indicates a resonant current value at a start time represented by the timing start signal;

providing an on-time control signal based on the detected current signal and a charging reference; and providing an on-time signal to control an on-time of the second switch of the resonant circuit based on the on-time control signal and an on-time initial value.

12. The control method of claim 11, wherein the timing start signal includes:

a signal indicating the first switch is turned on.

13. The control method of claim 11, wherein the step of providing the on-time control signal comprises:

providing a current comparison signal based on the detected current signal and a first charging reference; and providing a time adjustment signal based on the current comparison signal and an enable signal;

wherein when the detected current signal is larger than the first charging reference, the time adjustment signal is set to a preset value;

wherein the time adjustment signal is reset every switching period in response to the enable signal.

14. The control method of claim 13, wherein the step of providing the on-time signal comprises:

performing addition on the on-time initial value and the time adjustment signal to provide the on-time signal to control the on-time of the second switch of the resonant circuit.

15. The control method of claim 13, wherein the step of providing the on-time control signal further comprises:

providing a time regulation signal based on the detected current signal and a second charging reference;

wherein the first charging reference is larger than the second charging reference.

16. The control method of claim 15, wherein the step of providing the on-time signal comprises:

performing calculation based on the on-time initial value, the time adjustment signal and the time regulation signal to provide the on-time signal to control the on-time of the second switch of the resonant circuit.

17. The control method of claim 11, wherein the step of providing the on-time control signal comprises:

providing a time regulation signal based on the detected current signal and the charging reference.

18. The control method of claim 11, wherein the timing start signal includes:

a signal indicating the start time that is before the first switch is turned on.

19. The control method of claim 11, wherein the timing start signal includes:

a signal indicating the start time that is after the first switch is turned on.

* * * * *